United States Patent [19]
Black

[11] 3,901,536
[45] Aug. 26, 1975

[54] APPARATUS FOR ALIGNING HITCHES OF TOWING AND TOWED VEHICLES

[76] Inventor: Lewis Granville Black, 2403-1B Via Mariposa West, Laguna Hills, Calif. 92653

[22] Filed: June 3, 1974

[21] Appl. No.: 475,512

Related U.S. Application Data

[63] Continuation-in-part of Ser. No. 379,332, July 16, 1973, abandoned.

[52] U.S. Cl................ 280/477; 340/282; 340/52 R
[51] Int. Cl.²........................................... B60Q 1/00
[58] Field of Search ....... 280/477; 33/264; 340/282, 340/52 R; 307/10 R

[56] References Cited
UNITED STATES PATENTS

| | | | |
|---|---|---|---|
| 3,159,917 | 12/1964 | Whitehead............................ | 33/264 |
| 3,418,628 | 12/1968 | Fenner................................ | 340/52 R |
| 3,774,149 | 11/1973 | Bennett............................... | 340/52 R |

FOREIGN PATENTS OR APPLICATIONS

| | | | |
|---|---|---|---|
| 934,358 | 8/1963 | United Kingdom................ | 280/477 |

OTHER PUBLICATIONS

Hansen, C. G., "Trailer–Hitching Guide", (Article, Fotos & Drawing) In *Popular Science*, June 1970, p. 95; Q1.P8.

Primary Examiner—Leo Friaglia
Attorney, Agent, or Firm—Raymond L. Madsen, Esq.

[57] ABSTRACT

There is disclosed a visual aid for aligning a hitch of a towing vehicle with a mating hitch of a towed vehicle. A target is centrally located within a target area defined by a pair of boundary posts, the target assembly being attached to the towed vehicle and aligned with the hitch thereon forming a target area on the towed vehicle. Sighting apparatus is attached to the towing vehicle for aiming the towing vehicle at the target area and for contacting the target and activating an indicator when the engaging portions of the hitches are aligned for connection.

10 Claims, 8 Drawing Figures

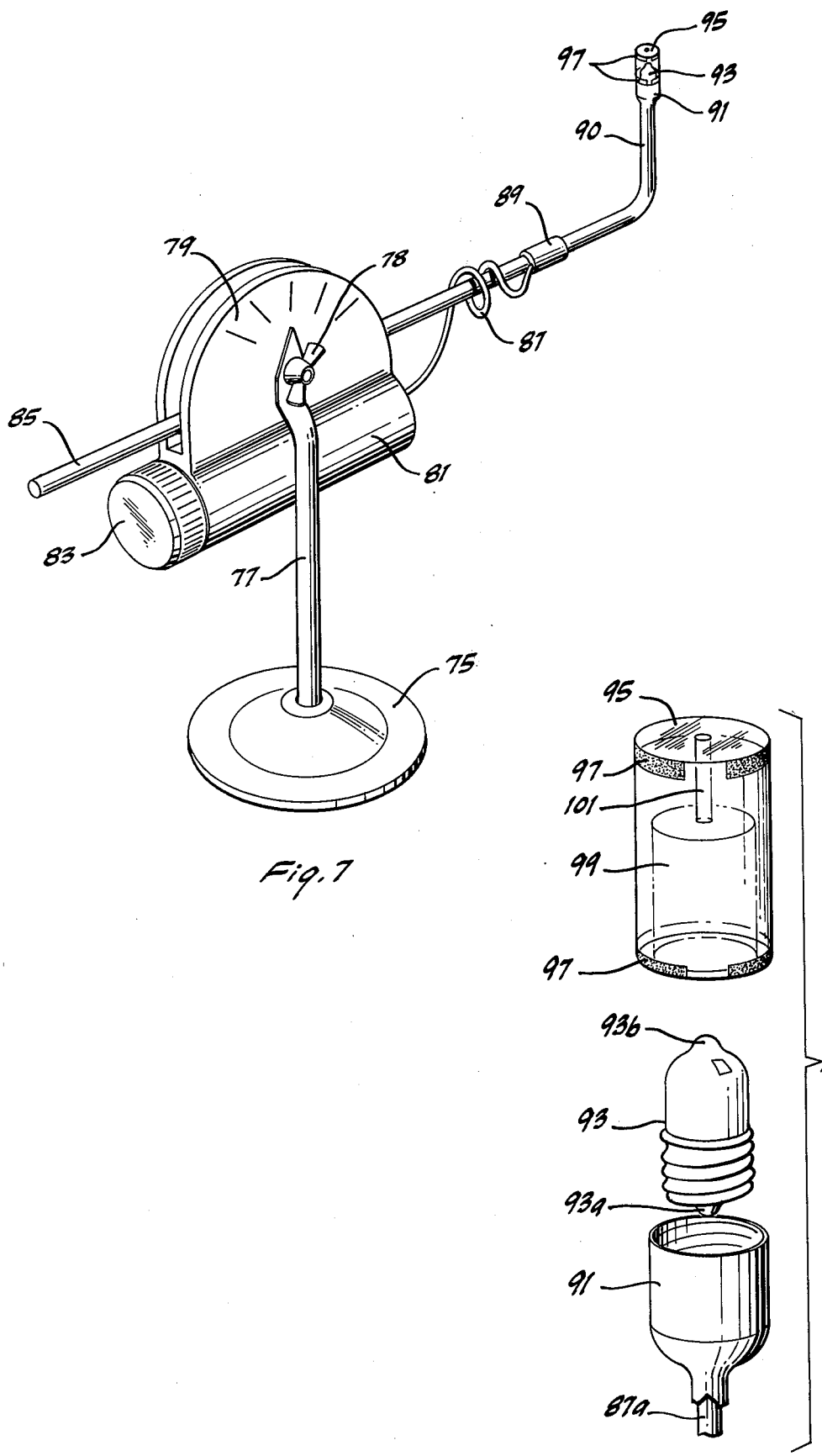

APPARATUS FOR ALIGNING HITCHES OF TOWING AND TOWED VEHICLES

This is a continuation in part of Ser. No. 379,332 filed July 16, 1973 and now abandoned.

The present invention relates to vehicle-guiding devices, and more particularly to visual aids for assisting the operator of a towing vehicle to couple the hitch member of the towing vehicle to the mating hitch member of a towed vehicle.

The connecting of hitches between a towing vehicle and a towed vehicle, such as a house trailer or a travel trailer, is a difficult procedure normally requiring the attention of two people, one to operate the towing vehicle, and the other to direct the driver of the towing vehicle to move the hitch member of the towing vehicle toward the hitch member of the towed vehicle and to stop the towing vehicle when the hitches are aligned for engagement. When an additional person is not available, the problems of the operator of the towing vehicles increase appreciably, and a considerable amount of maneuvering is encountered before the mating portions of the hitching apparatus are properly aligned for engagement.

In the field of alignment devices for hitching a towed vehicle to a towing vehicle, it has been the general practice to employ a rod or post attached to the hitch of the towed vehicle to indicate the location of the engaging portion of the hitch. Although such devices have served the purpose, they have not proved entirely satisfactory under all conditions of service for the reasons that considerable difficulty has been experienced in visibility of the rod or post and difficulties encountered in judging the distance between the post and the hitch of the towing vehicle. Further difficulties have been encountered in judging the angle at which the towing vehicle is approaching the hitch of the towed vehicle.

Those concerned with the development of alignment devices for assisting the towing vehicle operator in the alignment of hitches between the towing and towed vehicle have long recognized the need for an alignment target on the towed vehicle from which distance from the towing vehicle and the angle of approach of the towing vehicle are readily and visibly perceived. The present invention fulfills this need.

It has also been the general practice to employ sighting devices on the towing vehicle to more accurately aim the towing vehicle toward the hitch of the towed vehicle. Although such devices have served the purpose, they have not proved entirely satisfactory under all conditions of service for the reason that considerable difficulty has been experienced in visibility of the sighting device in respect to the target device on the towed vehicle.

One of the most critical problems confronting designers of aligning devices for towing and towed vehicle hitches has been the indication of precise alignment of the coupling portions of the hitches of the vehicles which is overcome by the present invention.

The general purpose of the invention is to provide guiding apparatus in the form of a target and an aiming member for assisting the operator of a towing vehicle to maneuver the hitch member of the towing vehicle into alignment with the hitch member of a towed vehicle and which embraces all the advantages of similarly employed guiding devices and possess none of the aforedescribed disadvantages. To attain this, the present invention contemplates a unique target assembly on the towed vehicle and a sighting member on the towing vehicle whereby distance and angle between the vehicles are readily perceived and visibility is substantially enhanced.

An object of the present invention is the provision of guiding apparatus for assisting the operator of a towing vehicle to align the hitch member thereof with the hitch member of a towed vehicle for interconnection.

Another object is to provide guiding apparatus which may be utilized by the operator of a towing vehicle without the need for assistance by another person in aligning the hitch of the towing vehicle with the hitch of a towed vehicle for interconnection.

It is a further object to provide a hitch guide for interconnecting a towing vehicle with a trailer when the vehicle and trailer are on different slopes or at an angle.

It is still another object to provide a trailer hitch alignment device which produces a readily discernable signal when the hitch members of the towing vehicle and the trailer are directly aligned for connection.

A still further object of the invention is to provide aligning apparatus which is self-contained, portable, and easily and quickly mounted on a towing vehicle and a towed vehicle for use in coupling the vehicles together, and then easily and quickly removed after such coupling has been accomplished.

Yet another object of the present invention is the provision of a highly visible target and sighting member by which a towed vehicle and a towing vehicle are easily positioned to align the coupling hitches of the vehicles under reduced lighting conditions.

Other objects and many of the attendant advantages of this invention will be readily appreciated as the same becomes better understood by reference to the following detailed description when considered in connection with the accompanying drawings in which like reference numerals designate like parts throughout the figures thereof, and wherein:

FIG. 7 shows an alternate configuration for the sighting device of FIGS. 1 and 2;

FIG. 8 illustrates an exploded view of the illuminated tip of the sighting device of FIG. 7.

Figure 1:
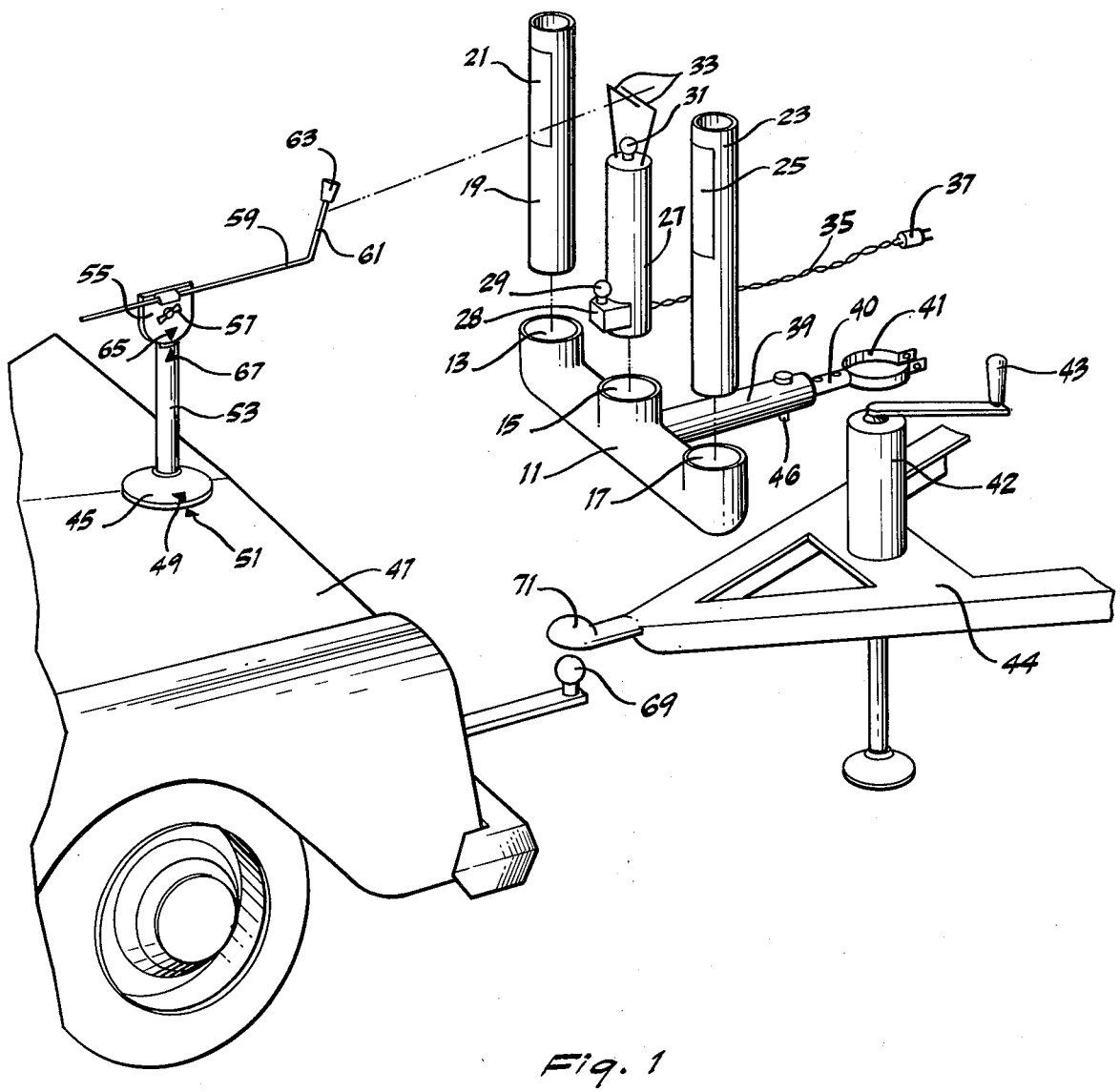
FIG. 1 illustrates an exploded pictorial view, partly in section, of a preferred embodiment of the invention.

Referring now to the drawings, wherein like reference characters designate like or corresponding parts throughout the several views, there is shown in FIG. 1 (which illustrates a preferred embodiment) base member 11 having equally spaced openings 13, 15 and 17 therein. Boundary post 19 is inserted into opening 13, and boundary post 23 is inserted into opening 17 substantially parallel to post 19. Target post 27 has an illuminating lamp base 28 with illuminating lamp 29 attached thereto and is inserted into opening 15 in base member 11 whereby target post 27 is centrally located between boundary posts 19 and 23. Target post 27 further has indicating lamp 31 mounted on the end thereof along with parallel flexible wire contact pair 33 connected to flexible vertical sections of wire which extend over indicating lamp 31. Boundary post 19 has reflecting surface 21 located thereon and boundary post 23 has reflecting surface 25 located thereon. Wire pair 35 is connected to plug 37 to provide power to illuminating lamp 29 and indicating lamp 31.

Base member 11 further has support post 39 attached thereto which in turn slides over rod 40 which is connected to clamp 41. Pin 46 removably attaches post 39 to rod 40. Clamp 41 is attached to trailer jackshaft 42 having crank handle 43 which jackshaft in turn is attached to the towed vehicle or trailer tongue 44.

Vacuum cup 45 is mounted on the smooth rear surface of towing vehicle 47 and is positioned thereon by aligning dart 49 on vacuum cup 45 with dart 51 on the surface of towing vehicle 47. Supporting rod 53 is attached to vacuum cup 45 and supports adjustable clamp 55 having adjustable wing nut 57 thereon. Rod 59 is adjustably held by clamp 55. Dart locators 65 and 67 on clamp 55 and rod 53, respectively, align rod 59 in the desired position. The other end of rod 59 is bent at an angle to form aiming or sighting section 61 having reflector 63 attached to the end thereof.

All items of FIG. 1 are relatively positioned such that rod section 61 "makes" contact pair 33 when ball 69 of towing vehicle 47 is located precisely under socket member 71 of the towed vehicle hitch 44.

Figure 2:
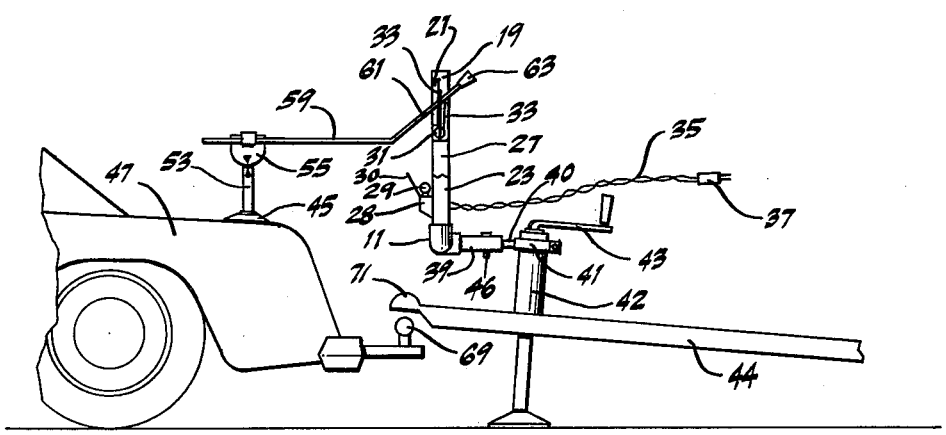
FIG. 2 shows a side view, partly in section, of the apparatus shown in FIG. 1.

Turning now to FIG. 2, a side view, partly in section, of the preferred embodiment of FIG. 1 is illustrated with base member 11 and boundary post 19 mounted thereon along with target post 27 and boundary post 23 (shown in section so that target post 27 may be viewed). Illuminating lamp 29 is shown with an additional rotatable reflector 30 to direct the light toward the target and boundary posts or to illuminate the hitch members. Indicating lamp 31 is activated and illuminated by the connection or making of contact pair 33. Power is supplied through plug 37 attached to a source of electrical power and further attached to wire 35 to the electrical circuits of illuminating lamp 29 and indicating lamp 31. Mounting posts 39 slides over rod 40 and attached thereto by pin 46. Rod 40 further connects the target assembly by clamp 41 to jackshaft 42 which in turn has crank 43 attached thereto for raising and lowering the hitch of the towed vehicle. Vacuum cup 45 is mounted on the smooth surface towing vehicle 47 and has rod 53 attached thereto which in turn is attached to clamp 55. Clamp 55 supports rod 59 with bent section 61 having reflector 63 attached to the end thereof. Vehicle 47 is shown in a position with respect to the towed vehicle tongue 44 such that section 61 of rod 59 "makes" contact pair 33 to activate indicating lamp 31, thereby indicating that socket member 71 of hitch 44 is precisely located over ball member 69 of towing vehicle 47.

Figure 3:
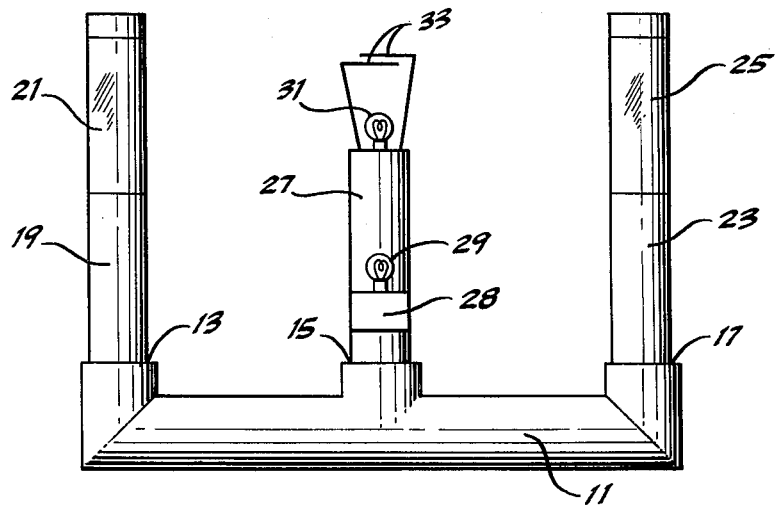
FIG. 3 illustrates a front view of the target assembly of the apparatus illustrated in FIGS. 1 and 2.

FIG. 3 illustrates a front view of the target assembly attached to the hitch of the towed vehicle. Base member 11 has openings 13, 15 and 17 therein into which target boundary post 19, target post 27 and target boundary post 23 are mounted, respectively. Boundary post 19 has reflective surface 21 thereon and boundary post 23 has reflective surface 25 thereon. Target post 27 has illuminating lamp base 28 and illuminating lamp 29 connected thereto along with indicating lamp 31 and contact pair 33 connected to the end thereof.

Figure 4:
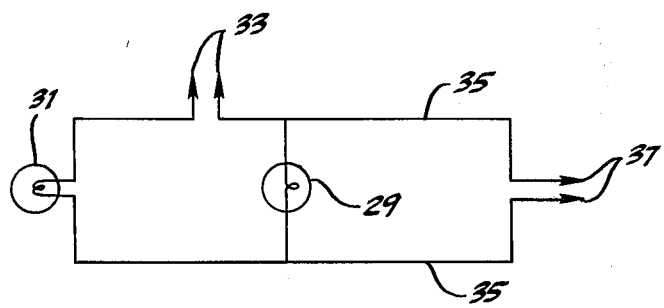
FIG. 4 shows a circuit diagram of the indicating and illuminating lamp circuit of the target assembly of FIG. 3.

FIG. 4 shows the circuit diagram connecting wire pair 35 and plug 37 to illuminating lamp 29 and connecting the series combination of contact pair 33 and indicating lamp 31 in parallel with illuminating lamp 29.

Figure 5:
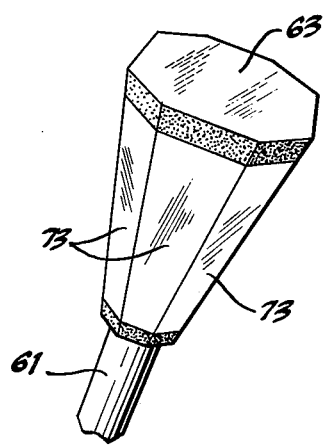
FIG. 5 illustrates the reflector attached to the tip of the sighting device shown in FIGS. 1 and 2.

Turning now to FIG. 5, there is illustrated a portion of sighting section 61 of rod 59 to which is attached reflector 63 having a multiplicity of facets 73 from which light is readily reflected to increase visibility. Reflective tape is also added to increase visibility.

Figure 6:
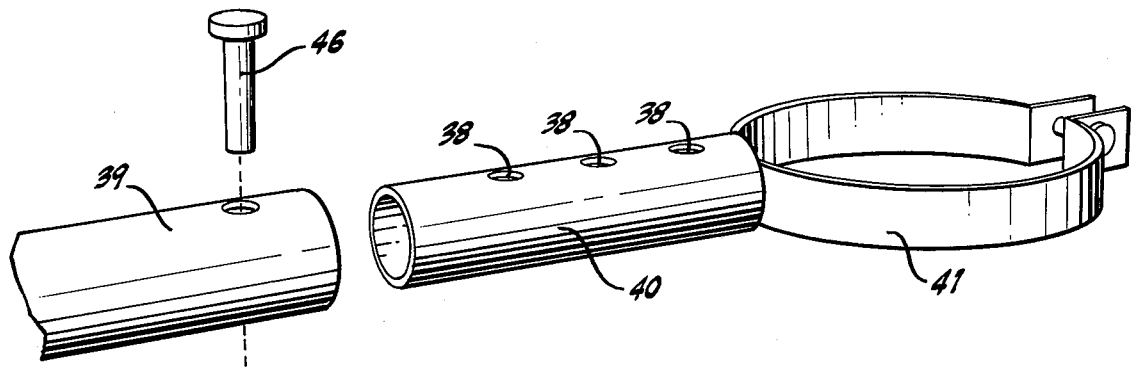
FIG. 6 illustrates the adjustable assembly for coupling the embodiment shown in FIG. 1 to the jackshaft of a trailer.

FIG. 6 is an exploded view showing rod 40 attached to clamp 41 and having a series of holes 38 therethrough through which pin 46 can be inserted to adjustably attach post 39 thereto.

FIG. 7 shows an alternate sighting device with suction cup 75 attached to support rod 77 which in turn is connected by bolt and wing nut 78 to clamp 79. Clamp 79 has index lines thereon and support rod 77 has a pointed tip which can be aligned with a selected index line for positioning the clamp with respect to the support rod at a predetermined angle. Clamp 79 further includes battery compartment or case 81 with end cover 83. Sighting rod 85 is held in clamp 79 and wire pair 87 exits from battery compartment 81, encircles rod 85 to provide adjustment slack and enters a hole in rod 85 under sleeve 89. One wire of wire pair 87 is attached to rod 85 under sleeve 89 and the other wire continues inside rod 85 and sighting section 90 to flared tip 91 where it makes contact with one electrode of lamp 93 mounted in flared tip 91. The other electrode of lamp 93 makes contact with flared tip 91. Plastic cover 95 has reflecting tape 97 around both ends thereof and fits over lamp 93 mounted in flared tip 91.

Directing the discussion to FIG. 8, there is illustrated an exploded view of the lamp assembly of FIG. 7. Wire 87a of wire pair 87 runs interior to flared tip 91 to contact electrode 93a of lamp 93 when the lamp is inserted in the flared tip. Lamp 93 is shown as a prefocused bulb having a lens 93b included in its enclosure as an integral part thereof. Plastic cover 95 has interior volume 99 into which lamp 93 is located when cover 95 is placed on flared tip 91. Bore 101 is centrally located in the plastic cover and extends axially from volume 99 to the end of cover 95. When lamp 93 is illuminated, bore 101 receives the illumination from lens 93b and scatters the illumination from the interior surface of the bore thereby producing a more clearly visible lighted tip. Reflecting tape 97 further enhances visibility.

There are wide variety of materials from which the target assembly can be fabricated such as plastic pipe including "T" and "L" sections thereof. Aluminum tubing and other materials such as wood may be used. Reflector 63 can be made from plastic material such as lucite or any suitable highly reflective material.

Operation of the invention may best be described by referring first to FIG. 1. As illustrated in the exploded view of the target assembly, it can be readily seen that the target assembly is easily assembled and disassembled for storage. Base member 11 may be removable from boundary post 19 and 23 and target post 27. Although not illustrated, support rod 39 may be removable from base member 11. When assembled together and attached to jackshaft 42, base member 11, boundary posts 19 and 23 and target post 27 provide a highly visible target at which a towing vehicle may be aimed.

Illuminating lamp 29 is lighted by plugging plug 37 into a source of electrical power usually available on most house trailers. In the event that power is not available on the trailer, a battery may be provided to supply the necessary electrical power. When lamp 29 is illuminated, not only is the target post 27 lighted, but the adjacent boundary posts 19 and 23 are illuminated along with reflecting surfaces 21 and 25, respectively, thereon. Therefore, regardless of the light conditions which are present the target assembly is made readily visible by illuminating lamp 29. Therefore, even at night, the target assembly is readily observed by the driver of the towing vehicle.

Illuminating lamp 29 may also be mounted horizontally instead of vertically as shown in FIG. 1. When mounted in a horizontal position, the tip of the lamp is facing the towing vehicle. The tip may be dipped into an opaque or translucent paint to eliminate or reduce illumination toward the towing vehicle and into the driver's eyes.

The target assembly and the sighting assembly comprising vacuum cup 45, support rod 53, clamp 55, and rod 59 are prealigned such that when socket member 71 of towed vehicle tongue 44 is precisely located over ball member 69 of towing vehicle 47, sighting section 61 of rod 59 connects contact pair 33 thereby illuminating indicating lamp 31. This initial alignment is preserved by attaching the dart locators on the vacuum cup and towing vehicle respectively. The position of the target assembly is preserved by leaving clamp 41 with rod 40 permanently mounted thereon and disengaging the target assembly by removing pin 46. Therefore, once the desired position of the vehicles is determined, the target assembly may be removed from rod 40 attached to the jackshaft as well as the sighting assembly removed from the towing vehicle, for storage in a convenient place until ready for use. When needed, the target assembly and the sighting assembly may be assembled and attached to the towed and towing vehicle, respectively, in the positions previously established, whereby the vehicles may be precisely attached to one another. As the towing vehicle 47 is moved toward the towed vehicle, reflector 63 is aimed visually at the target area formed between target boundary posts 19 and 23. Even under conditions of poor light, illuminating lamp 29 provides light which is reflected from surfaces 21 and 25 of the boundary posts to illuminate the multi-faceted surfaces 73 of reflector 63 as well as reflective tape thereon to provide good visibility for aiming purposes.

To further make the tip of rod 59 more visible, instead of reflector 63, the lighted tip of FIG. 7 may be used. By inserting a battery in case 81 and activating a switch (not illustrated) to connect the battery through wire pair 87 to lamp 93, the lamp is lighted to illuminate cover 95 and reflecting tape 97 along with bore 101 illustrated in FIG. 8. Therefore, as the towing vehicle 47 approaches the towed vehicle, the target boundary posts 19 and 23 provide a highly visible target area toward which lamp 93 of FIG. 7 can be aimed. This eliminates many of the problems of the prior aiming devices under conditions of poor visibility making it difficult to align an aiming device with the target. Since the target assembly comprises two target boundary posts 19 and 23 between which a target post 27 is centrally located, the distance of the towing vehicle from the target assembly is readily perceived by noting the size of the target area prescribed by the boundary posts, and the angle of approach is readily determined by noting the relative positions and sizes of the boundary posts as the towing vehicle is moved toward the towed vehicle. Therefore, the target assembly provided by boundary posts 19 and 23 attached to base member 11 gives the operator of the towing vehicle clear perception of distance and of angle of approach. Therefore, the vehicles can be easily interconnected when they are aligned at either a horizontal or vertical angle or both with respect to one another. Furthermore, lamp 29 which illuminates reflecting surfaces 21 and 25 as well as reflector 63 of the sighting assembly, enables the operator of the towing vehicle to accurately aim the towing vehicle toward the target assembly even under poor lighting conditions.

As the operator of the towing vehicle nears the target assembly, his attention can be focused from the target area defined by the boundary posts 19 and 23, to the target post 27. Since the target post is well illuminated by illuminating lamp 29 at its base, it is readily observed by the operator of the towing vehicle as the towing vehicle 47 nears the target assembly. The operator of the towing vehicle then aims reflector 63 or lamp 93 of FIG. 7 at target post 27 which reflector begins to reflect more light as the towing vehicle nears the target assembly. Upon approaching target post 27, sighting section 61 of rod 59 or sighting section 90 of rod 85 in FIG. 7 "makes" contact pair 33 lighting indicating lamp 31. When indicating lamp 31 is illuminated, the operator has positive indication of his precise alignment of socket member 71 of the towed vehicle rongue 44 over ball member 69 of towing vehicle 47. At this point, the operator stops the towing vehicle, gets out, and lowers the socket member 71 over ball member 69 to engage the hitches of the towing and towed vehicles.

The position of the towed and towing vehicles in precise alignment for interconnecting the socket member 71 with ball member 69 is illustrated in FIG. 2 wherein section 61 makes contact with contact pair 33 thereby completing the electrical circuit and illuminating indicating lamp 31. The circuit establishing the illumination of indicating lamp 31 is shown in FIG. 4., as an alternate method to dipping the bulb in paint. To shade the illuminating light 29 from the eyes of the operator of the towing vehicle, reflector 30 of FIG. 2 is provided. The reflector reflects the light toward the boundary posts and the target post where it is reflected to reflector 63 of the aiming assembly. This reflected light is sufficient to illuminate reflector 63 for good visibility by the operator. The reflector is rotatable to enable the operator to illuminate the ball and socket assembly for interconnection after alignment.

It now should be apparent that the present invention provides a sighting and target assembly which may be employed in conjunction with the alignment of the hitches of towed and towing vehicles such that the hitches of the vehicles may be engaged without the assistance of a second person to guide the operator of the towing vehicle.

Although particular components, etc., have been discussed in connection with a specific embodiment of sighting and target assemblies constructed in accordance with the teachings of the present invention, others may be utilized. Furthermore, it will be understood that although an exemplary embodiment of the present invention has been disclosed and discussed, other applications and circuit arrangements are possible in that the embodiments disclosed may be subjected to various changes, modifications, and substitutions without necessarily departing from the spirit of the invention.

What is claimed is:

1. A visual aid for aligning the hitch of a towing vehicle with the mating hitch of a towed vehicle, comprising:
   a base member adjustably connected to the hitch of the towed vehicle;
   a pair of parallel boundary posts attached to said base member for defining a rectangular target area;
   a target post centrally located within said target area and having one end thereof attached to said base member;
   an indicator lamp mounted on the other end of said target post;
   a pair of normally open contacts flexibly connected to the other end of said target post and extending longitudinally beyond said other end of said target post and said indicator lamp thereon, said pair of contacts being adapted to connect said indicator lamp to a source of electrical energy when said pair of contacts is closed; and
   sighting means adjustably connected to the towing vehicle for aiming the towing vehicle at said target area and said target post, said sighting means being adapted to engage and close said pair of contacts when said sighting means and said pair of contacts are positioned on the towing and towed vehicles, respectively, to indicate alignment of the engaging portions of the towing and towed vehicle hitches.

2. The visual aid described in claim 1 wherein said towed vehicle has a jackshaft housing and said base member is adjustably attached thereto.

3. The visual aid as described in claim 1 wherein said sighting means comprises:
   a vacuum cup for attaching to a smooth surface on said towing vehicle; and
   a rod adjustably attached to said vacuum cup, said rod having a section thereon adapted to close said pair of contacts when said hitches are aligned for engagement.

4. The visual aid described in claim 3 wherein said sighting means further comprises a multi-faceted reflector attached to said rod adjacent said section adapted to close said pair of contacts, said reflector making said section of said rod more readily visible.

5. The visual aid as described in claim 3 wherein said rod is substantially "L" shaped having a substantially horizontal section connected to said vacuum cup and a substantially vertical section most remote from said cup, said vertical section being the section adapted to close said pair of contacts.

6. The visual aid described in claim 5 wherein said normally open contacts flexibly connected to the other end of said target post are flexible substantially parallel spaced wires located substantially horizontally above the other end of said target post, each of said flexible substantially parallel spaced wires being supported by a substantially vertical section of flexible wire, one substantially vertical section of flexible wire being connected in series with said indicator lamp, said indicator lamp and the other substantially vertical section of flexible wire being adapted to be connected to a source of electrical power.

7. The visual aid described in claim 6 further including an illuminating lamp attached to said target post for illuminating said pair of parallel boundary posts and said target post for increasing visibility under reduced light conditions.

8. The visual aid described in claim 7 wherein said illuminating lamp is partially painted to substantially reduce the illumination toward the towing vehicle and to enhance the illumination of said pair of parallel boundary posts and said target post.

9. The visual aid described in claim 3 wherein said sighting means further comprises:
   a lamp attached to said rod adjacent said section adapted to close said pair of contacts;
   clamp means having a battery container therein for attaching said rod adjustably to said vacuum cup and for containing a battery; and
   means adapted to connect a battery within said battery container to said lamp whereby said lamp is illuminated.

10. The visual aid described in claim 9 wherein said lamp includes:
    a prefocussed bulb having a lens integrally a part thereof; and
    a cylindrical plastic cover which fits over and encloses, said prefocussed bulb, said cylindrical plastic cover having an axial bore therein oppositely disposed said lens of said prefocussed bulb whereby illumination from said prefocussed bulb is directed by said lens into said bore to illuminate the interior surfaces of said bore thereby enhancing the visibility of the prefocussed bulb and cylindrical plastic cover combination.

* * * * *